UNITED STATES PATENT OFFICE.

CHARLES DAY, OF LONDON, ENGLAND.

VARNISH.

SPECIFICATION forming part of Letters Patent No. 607,348, dated July 12, 1898.

Application filed October 25, 1897. Serial No. 656,287. (No specimens.) Patented in England July 2, 1896, No. 14,643.

*To all whom it may concern:*

Be it known that I, CHARLES DAY, a subject of the Queen of Great Britain, residing at London, England, have invented an Improved Liquid Varnish, (for which I have obtained a patent in Great Britain, dated July 2, 1896, No. 14,643,) of which the following is a full, clear, and exact description.

The invention has for its object to produce a liquid varnish which is of superior luster, which preserves the surfaces of articles to which it is applied, which is not liable to spontaneous combustion or to give off explosive or combustible gases, and which when applied is of great durability. For this purpose I prepare a compound of gums, bitumen, ivory-black, and turpentine, the latter being in sufficient quantity to liquefy the compound to the consistency required to enable it to be readily applied by a brush.

I have found that the following materials, proportions, and method of dissolving and combining the same are effective: gum-dammar, one pound; gum-elemi, one pound; gum-thus, one pound; bitumen, one pound; ivory-black, half an ounce; turpentine, one gallon. I place the gums in cold turpentine and allow sufficient time to liquefy the same. The bitumen, preferably Turkish, is melted by heat and when sufficiently thin a portion—say about half a pint—of linseed-oil is added. After this I add the liquefied gums and turpentine and then the ivory-black, the whole being continually stirred while being added together and until sufficiently blended.

By the use of the gums herein referred to the preparation acquires hardening, elastic, and drying properties.

I would here remark that the proportions of the materials above named may be somewhat varied.

Having fully described my invention, what I claim, and desire to secure by Letters Patent, is—

1. A liquid varnish composed of the following ingredients in about the proportions stated, namely, gum-dammar, gum-elemi, gum-thus and bitumen, each one pound, ivory-black one-half ounce and turpentine one gallon, substantially as described.

2. A liquid varnish composed of the following ingredients, in about the proportions stated, namely, gum-dammar, gum-elemi, gum-thus and bitumen, each one pound, linseed-oil one-half pint, ivory-black one-half ounce and turpentine one gallon, substantially as described.

In testimony whereof I affix my signature in presence of two witnesses.

C. DAY.

Witnesses:
    B. J. B. MILLS,
    CLAUDE K. MILLS.